United States Patent
Kuo et al.

(10) Patent No.: US 8,960,985 B2
(45) Date of Patent: *Feb. 24, 2015

(54) BACK FRAME, METHOD FOR MANUFACTURING BACK FRAME, AND BACKLIGHT SYSTEM

(75) Inventors: Yi-Cheng Kuo, Shenzhen (CN); Yu-Chun Hsiao, Shenzhen (CN); Jia-He Cheng, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 387 days.

This patent is subject to a terminal disclaimer.

(21) Appl. No.: 13/380,830

(22) PCT Filed: Nov. 23, 2011

(86) PCT No.: PCT/CN2011/082674
§ 371 (c)(1),
(2), (4) Date: Dec. 24, 2011

(87) PCT Pub. No.: WO2013/071550
PCT Pub. Date: May 23, 2013

(65) Prior Publication Data
US 2013/0128507 A1   May 23, 2013

(30) Foreign Application Priority Data
Nov. 18, 2011  (CN) .................. 2011 1 03661197

(51) Int. Cl.
*G02F 1/13357* (2006.01)
*G02F 1/1333* (2006.01)
(Continued)

(52) U.S. Cl.
CPC ............ *G02F 1/133308* (2013.01); *H05K 5/02* (2013.01); *G02B 6/0081* (2013.01);
(Continued)

(58) Field of Classification Search
CPC ...... G02F 1/133308; H05K 7/14; B23P 11/00
USPC ........................ 362/97.1, 633, 97.2; 349/58
See application file for complete search history.

(56) References Cited

U.S. PATENT DOCUMENTS

2011/0292315 A1* 12/2011 Bae et al. .................... 349/58
2013/0127740 A1*  5/2013 Kuo et al. .................. 345/173

FOREIGN PATENT DOCUMENTS

| CN | 101241268 A | 8/2008 |
|---|---|---|
| CN | 101281319 A | 10/2008 |
| CN | 201477817 U | 5/2010 |
| CN | 201672468 U | 12/2010 |
| CN | 102200259 A | 9/2011 |

(Continued)

*Primary Examiner* — Karabi Guharay
(74) *Attorney, Agent, or Firm* — Cheng-Ju Chiang

(57) ABSTRACT

The present invention provides a back frame of flat panel display device, which includes primary assembling pieces and secondary assembling pieces; the primary assembling pieces are of a number of at least two, the at least two primary assembling pieces being joined to form a main frame structure of the back frame; the secondary assembling pieces are arranged inside the back frame and joined to the back frame; some of the primary assembling pieces and the secondary assembling pieces are of first density and first strength and others are of second density and second strength; the first density is greater than the second density and the first strength is greater than the second strength. The present invention also provides a method for manufacturing a back frame of flat panel display device and a backlight system. The back frame, the method for manufacturing back frame, and the backlight system have a back frame mold that is of a simple structure and can reduce the expenditure of the back frame mold, and can also save the material used for back frame so as to lower down the cost of flat panel display device.

14 Claims, 10 Drawing Sheets

(51) Int. Cl.
  *H05K 5/02* (2006.01)
  *F21V 8/00* (2006.01)

(52) U.S. Cl.
  CPC .............. *G02F2001/133314* (2013.01); *G02F 2001/133328* (2013.01); *G02F 2201/46* (2013.01); *G02B 6/0065* (2013.01)
  USPC .............................. 362/633; 362/97.1; 349/58

(56) References Cited

FOREIGN PATENT DOCUMENTS

| | | |
|---|---|---|
| CN | 102236182 A | 11/2011 |
| CN | 102402045 A | 4/2012 |
| JP | 2004-191969 A | 7/2004 |
| JP | 2009-98310 A | 5/2009 |

\* cited by examiner

BACK FRAME, METHOD FOR MANUFACTURING BACK FRAME, AND BACKLIGHT SYSTEM

BACKGROUND OF THE INVENTION

1. Field of the Invention

The present invention relates to the field of displaying techniques, and in particular to a back frame of a flat panel display device, a method for manufacturing back frame, and a backlight system.

2. The Related Arts

The state-of-the-art liquid crystal display device comprises a front bezel, a panel, and a backlight module, of which the backlight module comprises a back frame, a reflector plate, a light guide, and a lighting assembly.

Currently, a variety of display panels of different sizes are available in the market to meet different needs of general consumers. For example, in the field of television set, the sizes of liquid crystal panels include 31.5, 42, 46, 48, and 55 inches. Different back frame molds are provided for liquid crystal planes of different sizes.

Referring to FIG. 1, FIG. 1 is a schematic view showing a conventional back frame of liquid crystal display device. As shown in FIG. 1, the conventional back frame 10 is a unitary back frame, and it is often that a unitary back frame 10 is made with metal stamping or plastic injection molding. The unitary back frame 10 consumes much material and has a high material cost. Further, a large-sized back frame 10 requires large-sized stamping equipment, and the size of mold corresponding to such a back frame 10 is large and the structure complicated, making the expenditure of the back frame mold high. As a consequence, the conventional back frame is of a high cost.

SUMMARY OF THE INVENTION

The technical issue to be addressed by the present invention is to provide a back frame, a method for manufacturing back frame, and a backlight system, which help lowering the material cost and mold cost.

To address the above technical issue, the present invention adopts a technical solution that provides a back frame of flat panel display device, which comprises primary assembling pieces and secondary assembling pieces; the primary assembling pieces are of a number of at least two, the at least two primary assembling pieces being joined to form a main frame structure of the back frame; the secondary assembling pieces are arranged inside the back frame and joined to the back frame; some of the primary assembling pieces and the secondary assembling pieces are of first density and first strength and others are of second density and second strength; the first density is greater than the second density and the first strength is greater than the second strength.

According to a preferred embodiment of the present invention, the primary assembling pieces are galvanized steel pieces having the first density and the first strength and the secondary assembling pieces are plastic pieces having the second density and the second strength.

According to a preferred embodiment of the present invention, the primary assembling pieces are plastic pieces having the second density and the second strength and the secondary assembling pieces are galvanized steel pieces having the first density and the first strength.

According to a preferred embodiment of the present invention, some of the primary assembling pieces and the secondary assembling pieces are of a third density and a third strength, the third density being between the first density and the second density, the third strength being between the first strength and the second strength.

According to a preferred embodiment of the present invention, some of the primary assembling pieces and the secondary assembling pieces are galvanized steel pieces having the first density and the first strength, some are plastic pieces having the second density and the second strength, and others are aluminum pieces of the third density and the third strength.

According to a preferred embodiment of the present invention, the at least two primary assembling pieces comprise first and second primary assembling pieces that are joined to each other, in which the first primary assembling piece has an end having a surface forming at least two joint sections that are arranged to space from each other in a lengthwise direction of the first primary assembling piece, the first primary assembling piece using one of the joint sections to join a corresponding end of the second primary assembling piece in order to form the main frame structure of the back frame that is of various sizes.

According to a preferred embodiment of the present invention, the joint sections comprise recesses formed in a surface of the first primary assembling piece and having a shape corresponding to the end of the second primary assembling piece for receiving the end of the second primary assembling piece.

According to a preferred embodiment of the present invention, the joint sections comprise recesses formed in a surface of the first primary assembling piece, the second primary assembling piece having a surface forming, at corresponding locations, protrusions, the protrusions being receivable in the recesses to join the first primary assembling piece and the second primary assembling piece to each other.

According to a preferred embodiment of the present invention, the second primary assembling piece has an end forming at least two protrusions that are arranged to space from each other in a lengthwise direction of the second primary assembling piece.

According to a preferred embodiment of the present invention, the recess of the first primary assembling piece forms in a bottom thereof a first through hole, the second primary assembling piece forming in a corresponding location a second through hole, the back frame comprising a fastener, the fastener extending through the first through hole and the second through hole to join the first primary assembling piece and the second primary assembling piece to each other.

According to a preferred embodiment of the present invention, the back frame comprises a third primary assembling piece and a fourth primary assembling piece; and the first primary assembling piece, the second primary assembling piece, the third primary assembling piece, and the fourth primary assembling piece are straight linear and are joined to each other in a leading end-to-tailing end manner to form a rectangular main frame structure enclosing the back frame.

According to a preferred embodiment of the present invention, the back frame comprises secondary assembling pieces that are arranged inside the main frame structure and the secondary assembling pieces are joined to the main frame structure.

According to a preferred embodiment of the present invention, the secondary assembling pieces comprise a first secondary assembling piece and a second secondary assembling piece, the first secondary assembling piece having two ends respectively joined to at least two primary assembling pieces of the first primary assembling piece, the second primary assembling piece, the third primary assembling piece, and the fourth primary assembling piece, the second secondary assembling piece having two ends respectively joined to at least two primary assembling pieces of the first primary assembling piece, the second primary assembling piece, the third primary assembling piece, and the fourth primary assembling piece.

According to a preferred embodiment of the present invention, the two ends of the first secondary assembling piece are respectively joined to the first primary assembling piece and the second primary assembling piece that are adjacent to each other and the two ends of the second secondary assembling piece are respectively joined to the third primary assembling piece and the fourth primary assembling piece that are adjacent to each other; or the two ends of the first secondary assembling piece are respectively joined to the first primary assembling piece and the third primary assembling piece that are opposite to each other and the two ends of the second secondary assembling piece are respectively joined to the first primary assembling piece and the third primary assembling piece that are opposite to each other.

According to a preferred embodiment of the present invention, the back frame comprises at least one bracing piece, which is releasably fixed to one or more of the first primary assembling piece, the second primary assembling piece, the third primary assembling piece, the fourth primary assembling piece, the first secondary assembling piece, and the second secondary assembling piece, the bracing piece forming a bump.

To address the above technical issue, the present invention adopts a technical solution that provides a method for making a back frame of flat panel display device, which comprises manufacturing primary assembling pieces and the secondary assembling pieces of a back frame, some of the primary assembling pieces and the secondary assembling pieces being of first density and first strength, others being of second density and second strength, the first density being greater than the second density and the first strength being greater than the second strength; joining the at least two primary assembling pieces to form a main frame structure of the back frame; and joining the secondary assembling pieces inside the main frame structure.

According to a preferred embodiment of the present invention, the step of manufacturing primary assembling pieces of a back frame comprises: manufacturing at least first and second primary assembling pieces, in which the first primary assembling piece has an end forming at least two joint sections, each of the joint sections having a structure that mates a corresponding end of the second primary assembling piece; and the step of joining at least two primary assembling pieces to form a main frame structure of the back frame comprises: selecting one joint section of the at least two joint sections according to a size of the back frame to join the corresponding end of the second primary assembling piece According to a preferred embodiment of the present invention, when an additional joint section is present between joining location of the second primary assembling piece and the end of the first primary assembling piece, before or after the step of selecting one joint section of the at least two joint sections according to a size of the back frame to join the corresponding end of the second primary assembling piece, the additional joint section of the first primary assembling piece that is located outward of the joining position of the second primary assembling piece is trimmed off.

To address the above technical issue, the present invention adopts a technical solution that provides a backlight system, which comprises a light source, a light homogenization mechanism, and a back frame; and the back frame carries the light source and the light homogenization mechanism, the back frame being any of the back frames described above.

The efficacy of the present invention is that to be distinguished from the state of the art, the present invention provides a back frame, a method for manufacturing back frame, and a backlight system that use at least two primary assembling pieces to form a main frame structure, secondary assembling pieces being arranged inside the main frame structure and joined to the main frame structure so as to make a mold for back frame simple in structure and the expenditure of the back frame mold is reduced, and the material used for back frame is saved so as to lower down the cost of flat panel display device; and at the same time, the primary assembling pieces and the secondary assembling pieces use materials of different densities and strengths so that through adopting combinations of various materials, it is possible to satisfy specific requirements for cost and technical effect.

DETAILED DESCRIPTION OF THE PREFERRED EMBODIMENTS

Figure 1:
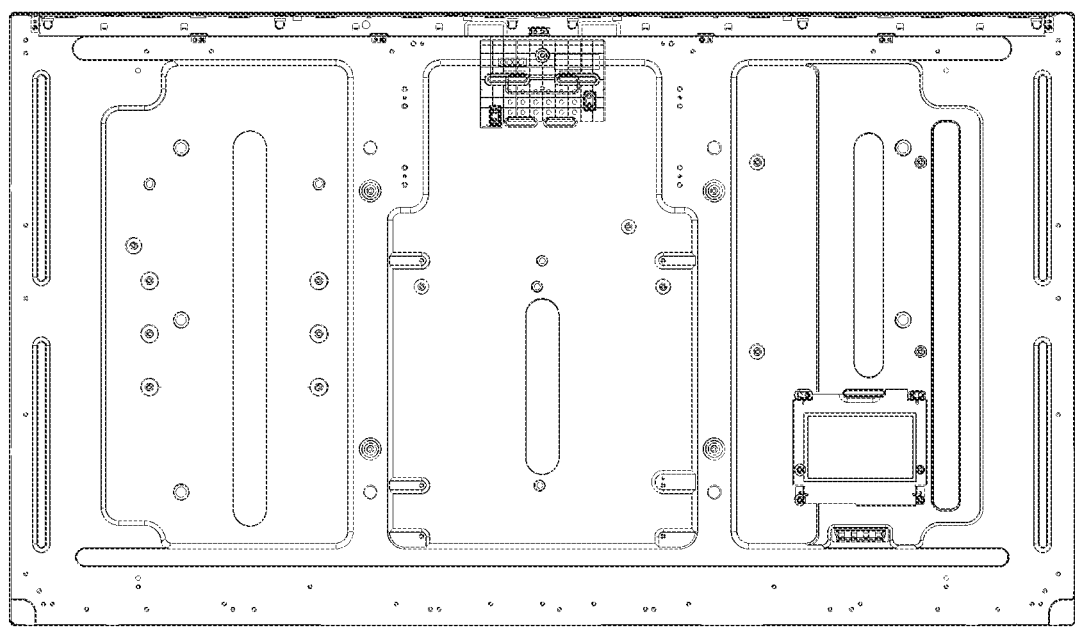
FIG. 1 is a schematic view showing a conventional back frame of liquid crystal display device.
Figure 2:
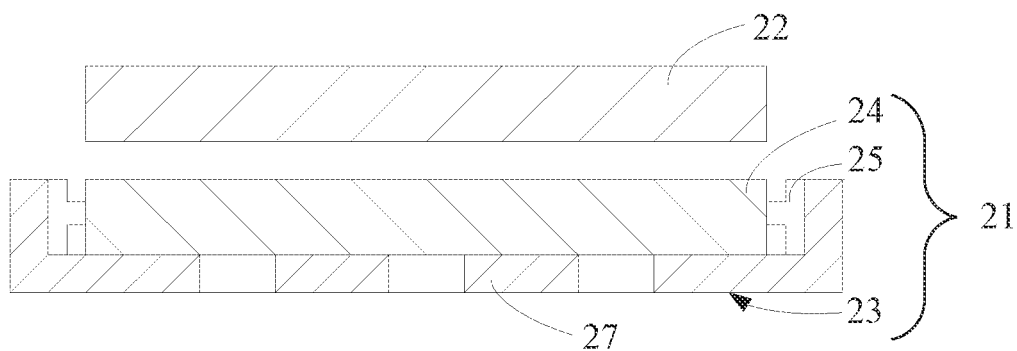
FIG. 2 is a schematic view showing a flat panel display device according to a first embodiment of the present invention.
Figure 3:
FIG. 3 is a schematic view showing a back frame of a flat panel display device according to a second embodiment of the present invention.

Referring to FIGS. 2-3, FIG. 2 is a schematic view showing a flat panel display device according to a first embodiment of the present invention and FIG. 3 is a schematic view showing a back frame of a flat panel display device according to a second embodiment of the present invention. As shown in FIG. 2, the flat panel display device 20 according to the instant embodiment comprises: a backlight system 21 and a display panel 22. The backlight system 21 is arranged on a back side of the display panel 22 and supplies light to the display panel 22.

In the instant embodiment, the backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the two of at least a first and second primary assembling pieces constitute a main frame structure 27 of the back frame 23.

Referring also to FIG. 3, the back frame 23 of the first embodiment comprises a first primary assembling piece 261 and a second primary assembling piece 262. The first primary assembling piece 261 has an end joined to an end of the second primary assembling piece 262, and the first primary assembling piece 261 has another end joined to another end of the second primary assembling piece 262 in order to form the main frame structure 27 of the back frame 23. The first primary assembling piece 261 and the second primary assembling piece 262 are both aluminum pieces or galvanized steel pieces. In the instant embodiment, the first primary assembling piece 261 and the second primary assembling piece 262 are L-shaped.

Figure 4:
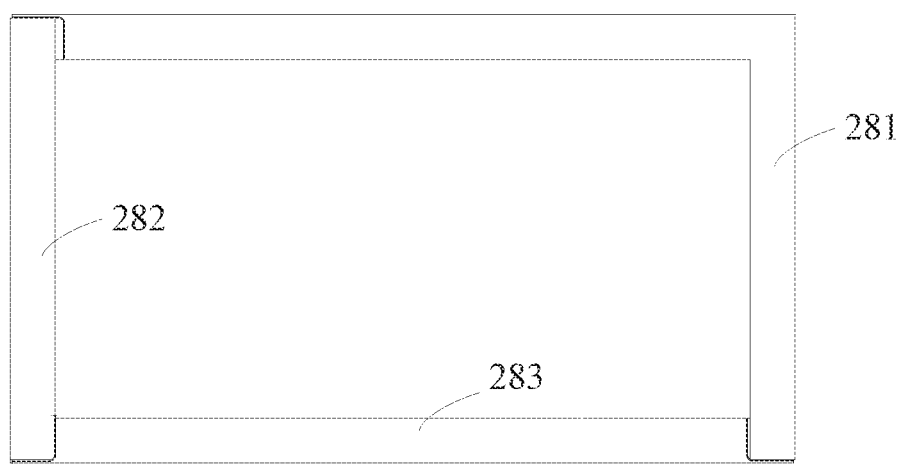
FIG. 4 is a schematic view showing a back frame of a flat panel display device according to a third embodiment of the present invention.

Referring also to FIG. 4, the back frame 23 of a second embodiment comprises a first primary assembling piece 281, a second primary assembling piece 282, and a third primary assembling piece 283. The three primary assembling pieces 281, 282, and 283 are assembled and joined to form a main frame structure 27 of the back frame 23. The three primary assembling pieces 281, 282, and 283 are all aluminum pieces or galvanized steel pieces. In the instant embodiment, the first primary assembling piece 281 is L-shaped, and the second and third primary assembling pieces 282, 283 are straight linear.

Further, the back frame 23 further comprises secondary assembling pieces arranged inside and joined to the main frame structure 27.

A detailed description will be given to the back frame 23 of the flat panel display device 20 according to the present invention, which comprises four primary assembling pieces and two secondary assembling pieces.

Figure 5:
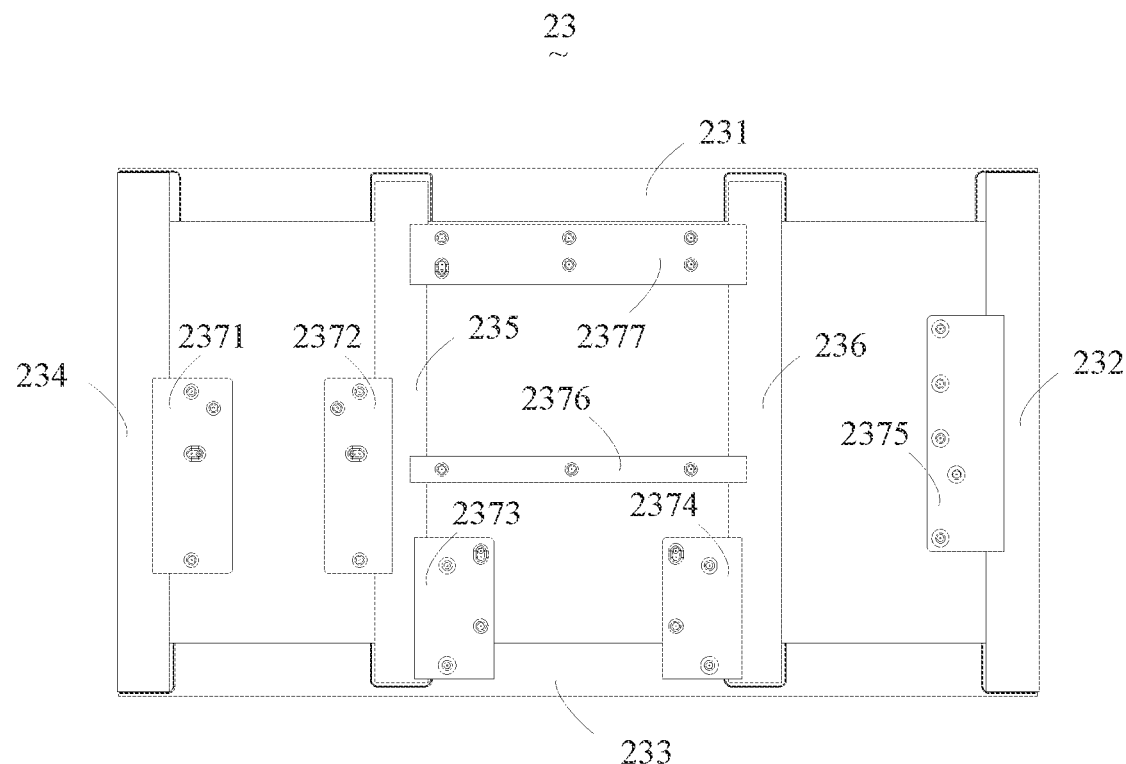
FIG. 5 is a schematic view showing a back frame of a flat panel display device according to a fourth embodiment of the present invention.

Referring to FIG. 5, FIG. 5 is a schematic view showing a back frame of flat panel display device according to a fourth embodiment of the present invention. As shown in FIG. 5, in the instant embodiment, a back frame 23 comprises: a first primary assembling piece 231, a second primary assembling piece 232, a third primary assembling piece 233, a fourth primary assembling piece 234, a first secondary assembling piece 235, a second secondary assembling piece 236, and bracing pieces 2371, 2372, 2373, 2374, 2375, 2376, and 2377. The first primary assembling piece 231, the second primary assembling piece 232, the third primary assembling piece 233, and the fourth primary assembling piece 234 are joined to each other in a leading end-to-tailing end manner to constitute a main frame structure 27 of the back frame 23. The first secondary assembling piece 235 and the second secondary assembling piece 236, serving as ancillary assembling pieces, are arranged in the main frame structure 27 and joined to the main frame structure 27.

Specifically, an end of the first primary assembling piece 231 is joined to an end of the second primary assembling piece 232, another end of the second primary assembling piece 232 is joined to an end of the third primary assembling piece 233, another end of the third primary assembling piece 233 is joined to an end of the fourth primary assembling piece 234, and another end of the fourth primary assembling piece 234 is joined to another end of the first primary assembling piece 231 in order to form the rectangular main frame structure 27. The first primary assembling piece 231, the second primary assembling piece 232, the third primary assembling piece 233, and the fourth primary assembling piece 234 are all aluminum pieces or galvanized steel pieces. In the instant embodiment, the first primary assembling piece 231, the second primary assembling piece 232, the third primary assembling piece 233, and the fourth primary assembling piece 234 are straight linear, yet in other embodiments, it is apparent to those skilled in the art to make all the first primary assembling piece 231, the second primary assembling piece 232, the third primary assembling piece 233, and the fourth primary assembling piece 234 L-shaped, or some being straight linear and the remaining being L-shaped. For example, in FIG. 3, the first primary assembling piece 261 and the second primary assembling piece 262 are both L-shaped; in FIG. 4, the first primary assembling piece 281 is L-shaped, while the second and third primary assembling pieces 282 and 283 are straight linear.

Figure 6:
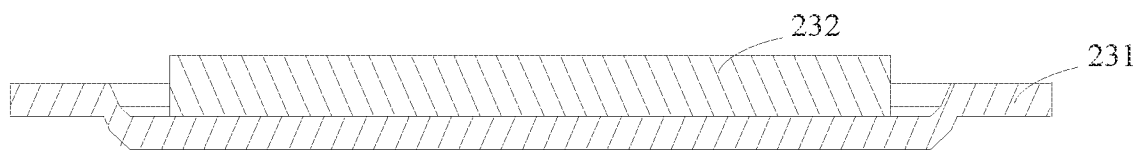
FIG. 6 is a schematic view showing a joining structure of a flat panel display device according to a fifth embodiment of the present invention.

In the instant embodiment, the back frame 23 of the flat panel display device 20 is formed by joining connection. As shown in FIG. 6, an illustrative example is given for the connection of an end of the first primary assembling piece 231 to an end of the second primary assembling piece 232, wherein the end of the second primary assembling piece 232 is joined to the end of the first primary assembling piece 231 by means of for example screwing, fastening, or welding, to have the end of the second primary assembling piece 232 connected to the end of the first primary assembling piece 231.

Figure 7:
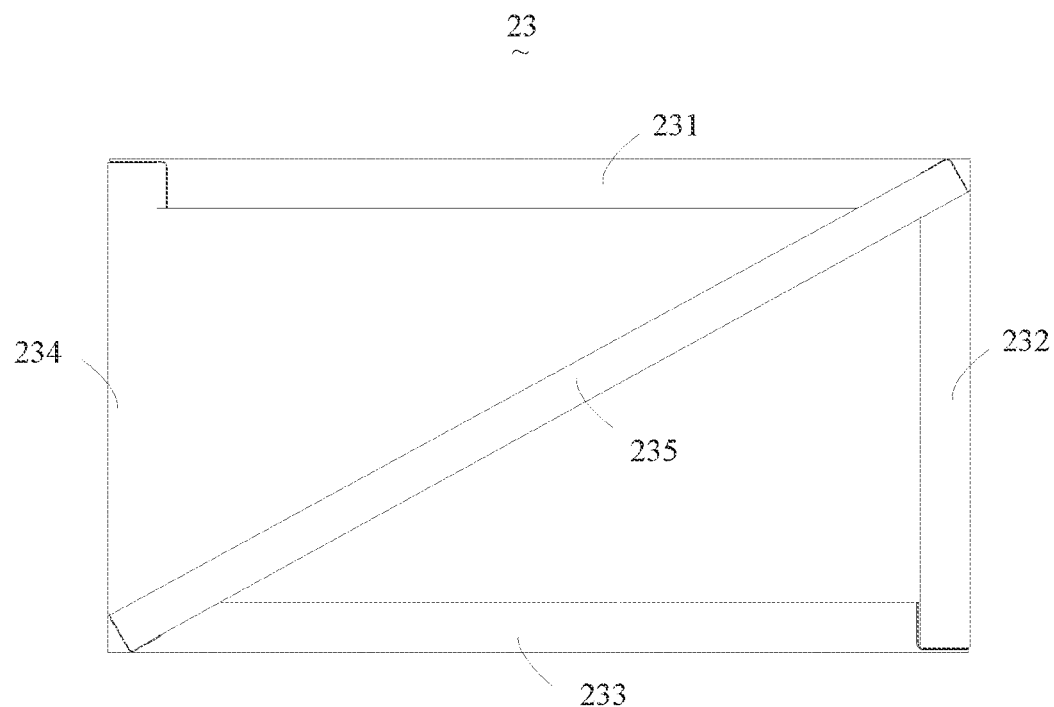
FIG. 7 is a schematic view showing a diagonally-arranged first secondary assembling piece mounted to a main frame structure of a flat panel display device according to a sixth embodiment of the present invention.
Figure 8:
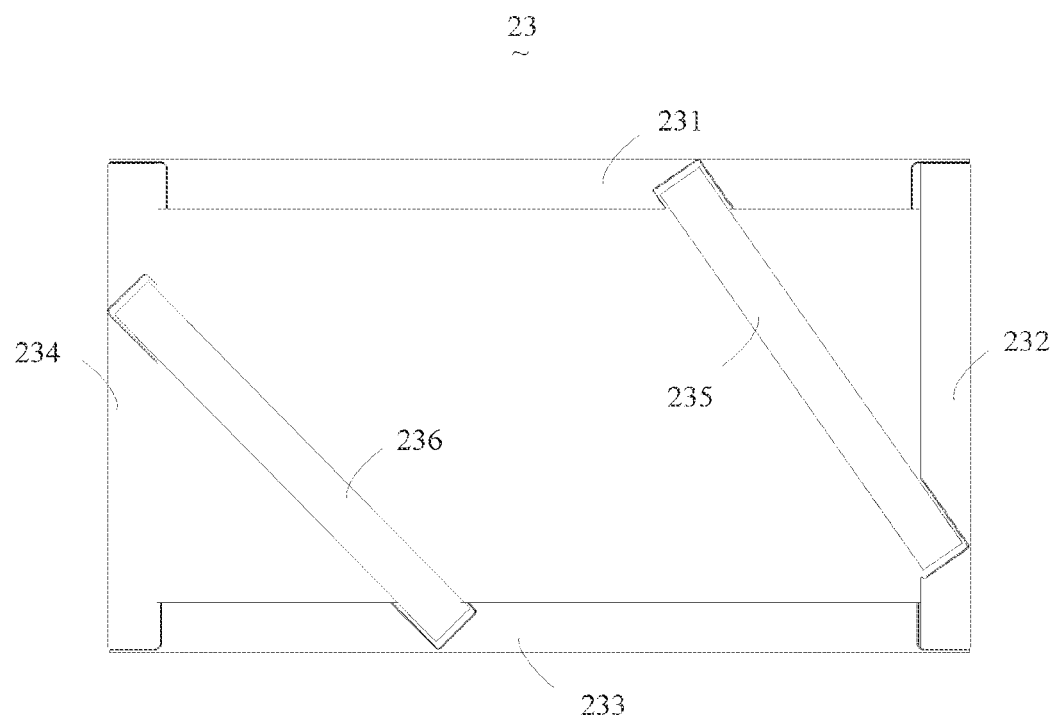
FIG. 8 is a schematic view showing a first secondary assembling piece and a second secondary assembling piece mounted to a main frame structure of a flat panel display device according to a seventh embodiment of the present invention.

In the instant embodiment, the first secondary assembling piece 235 and the second secondary assembling piece 236 are arranged in the main frame structure 27 of the back frame 23. An end of the first secondary assembling piece 235 is joined to the first primary assembling piece 231 and another end of the first secondary assembling piece 235 is joined to the third primary assembling piece 233; and an end of the second secondary assembling piece 236 is joined to the first primary assembling piece 231 and another end of the second secondary assembling piece 236 is joined to the third primary assembling piece 233. Further, the second primary assembling piece 232, the fourth primary assembling piece 234, the first secondary assembling piece 235, and the second secondary assembling piece 236 are arranged parallel to each other. In other embodiments, those skilled in the art may arrange at least one secondary assembling piece in the main frame structure 27. For example, only the first secondary assembling piece 235 is arranged in the main frame structure 27. Further, the two ends of the first secondary assembling piece 235 can be selectively joined to at least two of the primary assembling pieces of the first primary assembling piece 231, the second primary assembling piece 232, the third primary assembling piece 233, and the fourth primary assembling piece 234. For example, the first secondary assembling piece 235 is set diagonally in the main frame structure 27, as shown in FIG. 7. Similarly, the two ends of the second secondary assembling piece 236 can be selectively joined to at least two of the primary assembling pieces of the first primary assembling piece 231, the second primary assembling piece 232, the third primary assembling piece 233, and the fourth primary assembling piece 234. For example, the two ends of the first secondary assembling piece 235 are respectively joined to the first primary assembling piece 231 and the second primary assembling piece 232 that are adjacent to each other and the two ends of the second secondary assembling piece 236 are respectively joined the third primary assembling piece 233 and the fourth primary assembling piece 234 that are adjacent to each other, as shown in FIG. 8.

In the instant embodiment, the back frame 23 comprises seven bracing pieces 2371, 2372, 2373, 2374, 2375, 2376, and 2377. The bracing piece 2371 is fixed to the fourth primary assembling piece 234; the bracing pieces 2372, 2373 are both fixed to the first secondary assembling piece 235; the bracing piece 2374 is fixed to the second secondary assembling piece 236; the bracing piece 2375 is fixed to the second primary assembling piece 232; and the bracing pieces 2376, 2377 are each fixed, at two ends thereof, to the first secondary assembling piece 235 and the second secondary assembling piece 236. In practice, the bracing pieces can be fixed to one or more of the first primary assembling piece 231, the second primary assembling piece 232, the third primary assembling piece 233, the fourth primary assembling piece 234, the first secondary assembling piece 235, and the second secondary assembling piece 236. In other embodiments, those skilled in the art may mount bracing pieces of any other numbers to the back frame 23, such as one or more bracing pieces. Further, the bracing pieces can be releasably fixed to one or more of the first primary assembling piece 231, the second primary assembling piece 232, the third primary assembling piece 233, the fourth primary assembling piece 234, the first secondary assembling piece 235, and the second secondary assembling piece 236.

The bracing pieces 2371, 2372, 2373, 2374, 2375, 2376, and 2377 may be provided with bumps (not labeled) so that the back frame 23 may fix components, such as circuit boards, with such bumps.

Molds for making the back frame 23 will be described. In the instant embodiment, the first primary assembling piece 231 and the third primary assembling piece 233 are of the same size and shape so that they can be made by stamping with the same mold. The second primary assembling piece 232, the fourth primary assembling piece 234, the first secondary assembling piece 235, and the second secondary assembling piece 236 are of the same size and shape so that they can be made by stamping with the same mold, making it possible to share the mold. Thus, the back frame 23 of the present invention can be made by stamping with only two small-sized molds, and compared to the conventional back frame 10 that requires a large-sized mold, the molds for making the back frame 23 of the present invention are simple in structure and small in size and thus the cost of mold for the back frame 23 can be lowered. Further, compared to the whole back frame structure of the conventional back frame 10, the back frame 23 of the present invention can significantly save material used and thus reduce the manufacturing cost of the flat panel display device 20.

Figure 9:
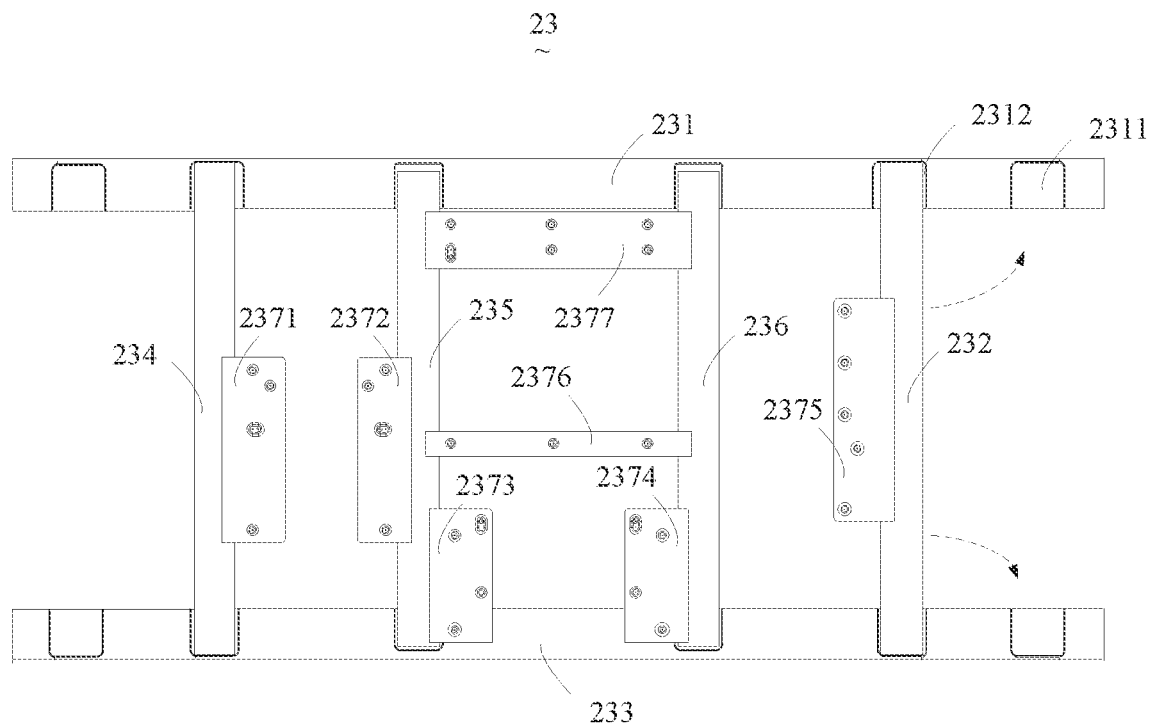
FIG. 9 is a schematic view showing joint sections of a back frame of a flat panel display device according to an eighth embodiment of the present invention.

Referring to FIG. 9, FIG. 9 is a schematic view showing joint sections of a back frame of a flat panel display device according to an eighth embodiment of the present invention. As shown in FIG. 9, in the instant embodiment, an end of the first primary assembling piece is provided with two joint sections, and the joint sections have a structure mating an end of the second primary assembling piece so that the first primary assembling piece can be joined to a corresponding end of the second primary assembling piece.

Figure 10:
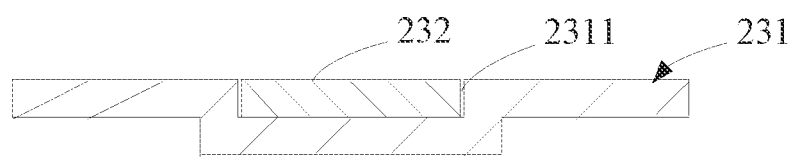
FIG. 10 is a cross-sectional view showing a first example of joint section of FIG. 9.

Specifically, the first primary assembling piece 231 has an end forming joint sections 2311, 2312, and the joint sections 2311, 2312 are arranged in a spaced manner in a lengthwise direction of the first primary assembling piece 231. The joint sections 2311, 2312 are formed by forming recesses having a shape mating an end of the second primary assembling piece 232 in the first primary assembling piece 231 in order to receive the end of the second primary assembling piece 232 therein. As shown in FIG. 10, the joint sections 2311, 2312 are recesses that do not extend through opposite surfaces of the end of the first primary assembling piece 231 and the recesses are of a rectangular shape with the second primary assembling piece 232 being straight linear.

Figure 11:
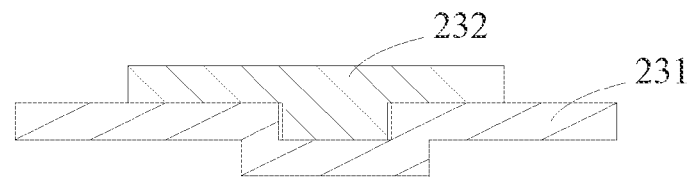
FIG. 11 is a schematic view showing a joining structure of a joint section of a back frame of a flat panel display device according to a ninth embodiment of the present invention.

To assemble a large-sized back frame 23, the joint section 2311 that is close to the very end of the first primary assembling piece 231 is first taken and a second primary assembling piece 232 having a corresponding width is selected. Afterwards, an end of the second primary assembling piece 232 is positioned in the recess of the joint section 2311. And then, means, such as screwing, fastening, or welding, is applied to join and fix the end of the second primary assembling piece 232 to the joint section 2311. To assemble a small-sized back frame 23, the joint section 2312 that is distant from the very end of the first primary assembling piece 231 is first chosen and a second primary assembling piece 232 having a corresponding width is selected. Afterwards, an end of the second primary assembling piece 232 is positioned in the recess of the joint section 2312. And then, means, such as screwing, fastening, or welding, is applied to join and fix the end of the second primary assembling piece 232 to the joint section 2312. Specifically, for example the second primary assembling piece 232 forms a protrusion at a corresponding location on a surface thereof, and the protrusion of the second primary assembling piece 232 is embedded in the recess the first primary assembling piece 231 at a corresponding location in order to join the first primary assembling piece 231 and the second primary assembling piece 232, as shown in FIG. 11. Further, the second primary assembling piece 232 may form, on one end thereof, at least two protrusions that are spaced in the lengthwise direction of the second primary assembling piece 232, such as two, three, or four protrusions.

Figure 12:
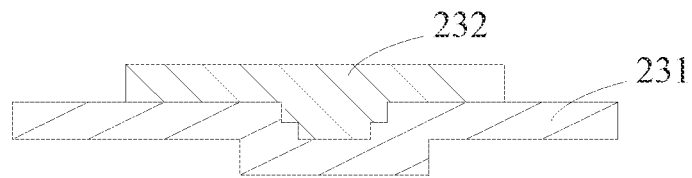
FIG. 12 is a schematic view showing a joining structure of a joint section of a back frame of a flat panel display device according to a tenth embodiment of the present invention.
Figure 13:
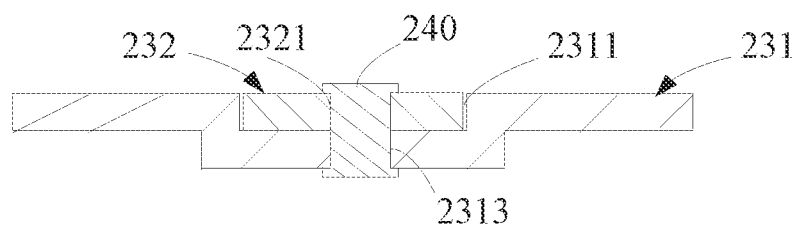
FIG. 13 is a schematic view showing a joining structure of a joint section of a back frame of a flat panel display device according to an eleventh embodiment of the present invention.

Furthermore, the recess of the first primary assembling piece 231 can be a recess of a multi-stepped configuration and the second primary assembling piece 232 forms, at a corresponding location, a protrusion having a multi-stepped configuration corresponding to the recess, as shown in FIG. 12. Further, as shown in FIG. 13, taking the joint section 2311 as an example, the recess of the first primary assembling piece 231 forms, in a bottom thereof, a first through hole 2313, and the second primary assembling piece 232 forms, at a location corresponding to the joint section 2311, a second through hole 2321. The back frame 23 further comprises a fastener 240. The fastener 240 extends through the first through hole 2313 and the second through hole 2321 to joint the first primary assembling piece 231 and the second primary assembling piece 232 to each other.

Figure 14:
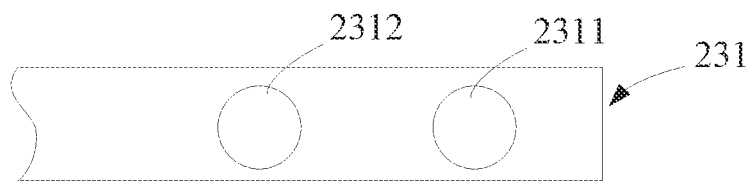
FIG. 14 is a schematic view showing a joint section of a back frame of a flat panel display device according to a twelfth embodiment of the present invention.

As shown in FIG. 14, in another embodiment of the back frame of flat panel display device according to the present invention, the recesses of the joint sections 2311, 2312 of the first primary assembling piece 231 are of a circular shape. Yet, in other embodiments, those skilled in the art may arrange the shape of the recesses to be other polygonal configurations, such as triangle.

Figure 15:
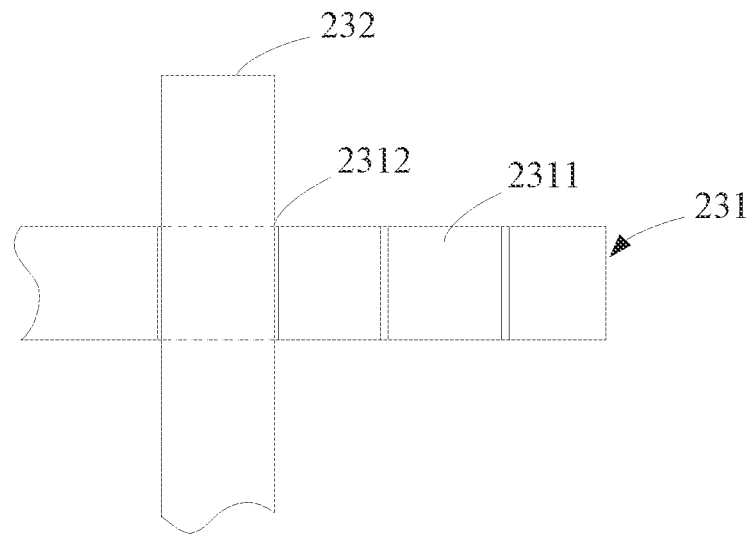
FIG. 15 is a schematic view showing a joint section of a back frame of a flat panel display device according to a thirteenth embodiment of the present invention.

As shown in FIG. 15, in another embodiment of the back frame of flat panel display device according to the present invention, the joint sections 2311, 2312 are recesses that do not extend through opposite surfaces of the first primary assembling piece 231, whereby an end of the second primary assembling piece 232 is movable within the joint sections 2311, 2312. For example, after the end of the second primary assembling piece 232 is set extending beyond and joined and fixed to the joint section 2312, the portion of extension is then trimmed off so that the length of the second primary assembling piece 232 that serves as a primary assembling piece of the back frame can be adjusted.

In the present invention, the other end of the first primary assembling piece 231 and both ends of the third primary assembling piece 233 are all provided with two joint sections having a structure identical to that of the joint sections 2311, 2312. In other words, the first primary assembling piece comprises at least two joint sections. Repeated description will be omitted here.

In summary, the present invention provides a back frame 23 having a first primary assembling piece that is provided with at least two joint sections. The number of the joint section can be selected according to the requirement of customers. In the instant embodiment, a description is given to an example comprising two joint sections 2311, 2312. Thus, to prepare the molds for making the back frame 23, only two sets of mold are needed, namely one mold for a first primary assembling piece and the other mold for a second primary assembling piece. The first primary assembling piece may be provided with a plurality of joint sections for joining operation in order to form various sizes for the back frame 23. To assemble the back frame 23, based on the desired size of the back frame 23, the corresponding one of the joint sections is selected. With the joint section, the second primary assembling piece is joined to the joint section of the first primary assembling piece and the other joint section of the first primary assembling piece that is located outward of the joining location of the second primary assembling piece is trimmed off to obtain a desired size of the back frame 23. Compared to the conventional technology that requires different back frame molds for making different sizes of back frame 10, the back frame of the flat panel display device 23 according to the present invention requires only a mold for the first primary assembling piece and a mold for the second primary assembling piece 28 so that mold sharing among various sizes of product can be realized and the molds used are of simple structures, allowing of reduction of expenditure of the molds for back frames.

The present invention also provides a mold for making a back frame of flat panel display device. The back frame mold is provided with a main pattern for forming a primary assembling piece of the back frame and the main pattern comprises a sub-pattern that forms at least two joint sections on an end of the primary assembling piece. The primary assembling piece comprises the previously discussed first primary assembling piece and second primary assembling piece, corresponding to the above mentioned main pattern; and the joint section comprises the previously discussed joint section of the first primary assembling piece, corresponding to the above mentioned sub-pattern. Repeated description is omitted herein.

Further, according to different requirements, some of the primary assembling pieces and the secondary assembling pieces of the back frame according to the present invention have a first density and a first strength and others have a second density and a second strength. The first density is greater than the second density and the first strength is greater than the second strength. Certainly, there are some of the primary assembling pieces and the secondary assembling pieces of the back frame that have a third density and a third strength with the third density between the first density and the second density and the third strength between the first strength and the second strength.

Figure 16:
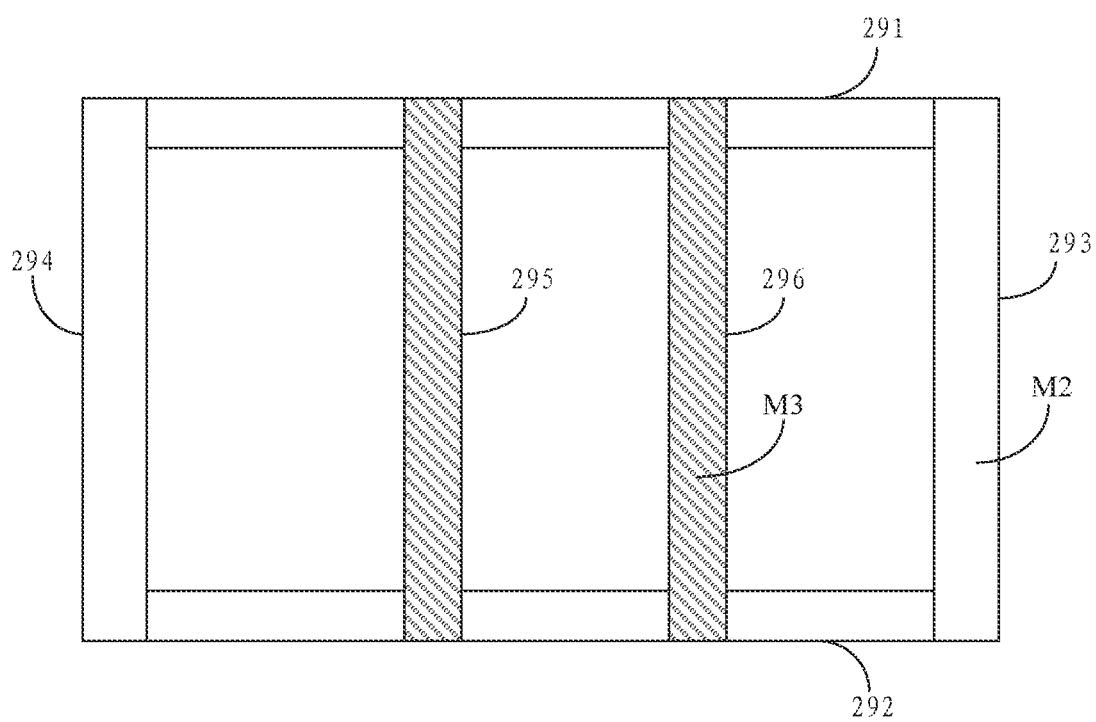
FIG. 16 is a schematic view showing a back frame of a flat panel display device according to a fourteenth embodiment of the present invention.
Figure 17:
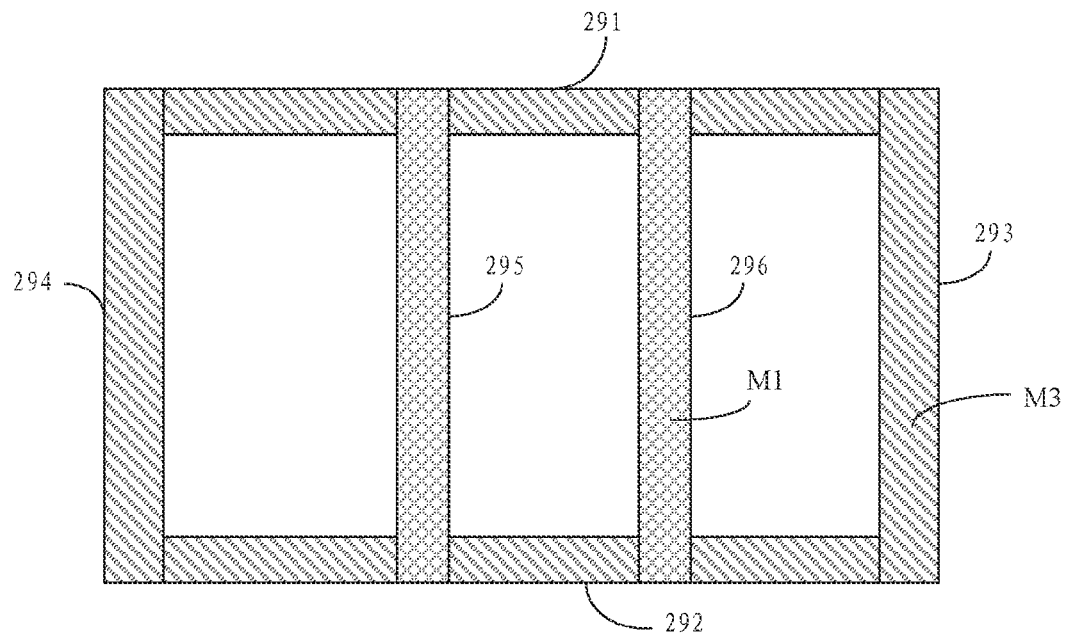
FIG. 17 is a schematic view showing a back frame of a flat panel display device according to a fifteenth embodiment of the present invention.
Figure 18:
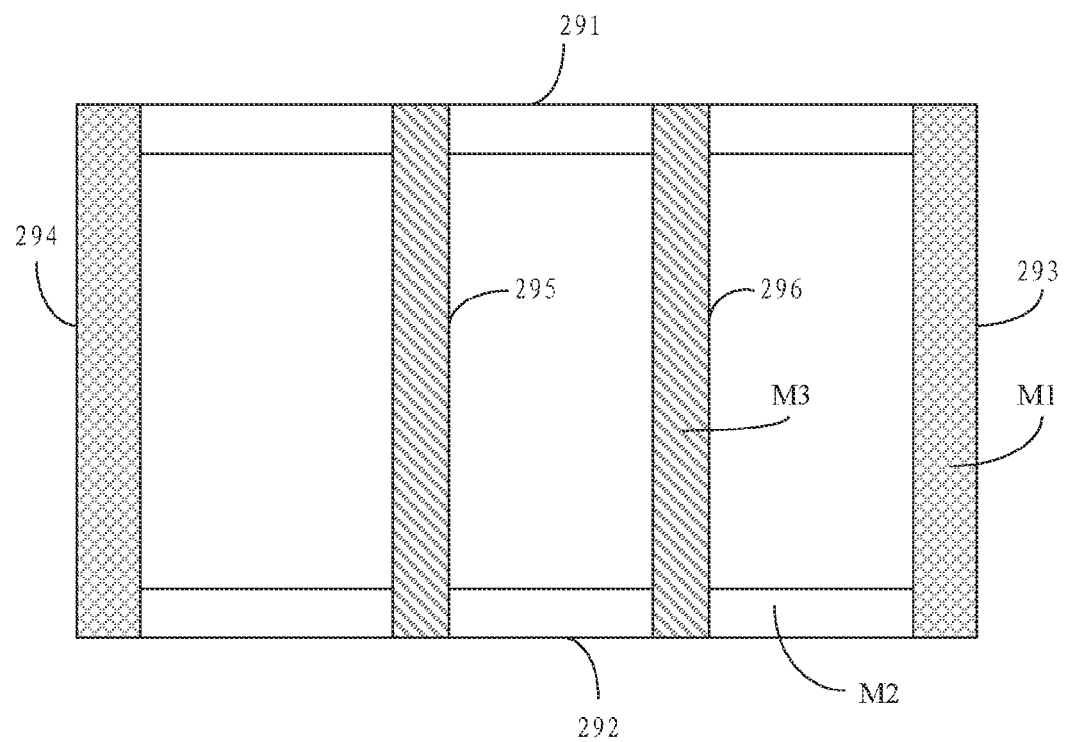
FIG. 18 is a schematic view showing a back frame of a flat panel display device according to a sixteenth embodiment of the present invention.

As shown in FIGS. 16, 17, and 18, an example that comprises four primary assembling pieces and two secondary assembling pieces will be taken to describe the back frame 23 of the flat panel display device 20 of the present invention can be of choice among different materials for the primary assembling pieces and the secondary assembling pieces thereof according to different requirements.

As shown in FIG. 16, the back frame has a main frame structure that comprises a first primary assembling piece 291, a second primary assembling piece 292, a third primary assembling piece 293, and a fourth primary assembling piece 294. The first primary assembling piece 291, the second primary assembling piece 292, the third primary assembling piece 293, and the fourth primary assembling piece 294 are galvanized steel pieces M2 of first density and first strength and a first secondary assembling piece 295 and a second secondary assembling piece 296 are plastic pieces M3 of second density and second strength. Other primary assembling pieces can be aluminum pieces M1 of third density and third strength. With this way of design of the back frame, the primary assembling pieces are made of galvanized steel pieces or aluminum pieces to ensure the strength of the structure, and the secondary assembling pieces are made of plastic material to reduce the overall weight of the structure. Further, the plastic material can be integrally molded, requiring no thread tapping and having the advantages of low material weight and low cost.

As shown in FIG. 17, the back frame has a main frame structure that comprises a first primary assembling piece 291, a second primary assembling piece 292, a third primary assembling piece 293, and a fourth primary assembling piece 294. The first primary assembling piece 291, the second primary assembling piece 292, the third primary assembling piece 293, and the fourth primary assembling piece 294 are plastic pieces of a second density and a second strength, and the first secondary assembling piece 295 and the second secondary assembling piece 296 are aluminum pieces of a third density and a third strength.

The secondary assembling pieces can be galvanized steel pieces of a first density and a first strength.

With this way of design of the back frame, the primary assembling pieces are made of plastic material, so that the overall weight of the back frame is significantly reduced and cost is greatly lowered down. The secondary assembling pieces can be made of aluminum material or galvanized steel to improve the overall strength of the structure. Further, using aluminum material ensures the heat dissipation capability of the back frame.

Certainly, in another embodiment, some of the primary assembling pieces and the secondary assembling pieces can be of a third density and a third strength with the third density between the first density and the second density and the third strength between the first strength and the second strength.

For example, as shown in FIG. 18, the back frame has a main frame structure that comprises a first primary assembling piece 291, a second primary assembling piece 292, a third primary assembling piece 293, and a fourth primary assembling piece 294. And, the back frame further comprise a first secondary assembling piece 295 and a second secondary assembling piece 296 that arranged inside the main frame structure. The first primary assembling piece 291 and the second primary assembling piece 292 galvanized steel pieces M2 of first density and first strength; the third primary assembling piece 293 and the fourth primary assembling piece 294 are aluminum pieces M1 of third density and third strength; and the first secondary assembling piece 295 and the second secondary assembling piece 296 are plastic pieces M3 of second density and second strength. In other embodiments, those skilled in the art may carry out various combinations of multiple materials according to practical needs. This way of design of material combination is flexible and may satisfy specific requirements for cost and technical effect.

Figure 19:
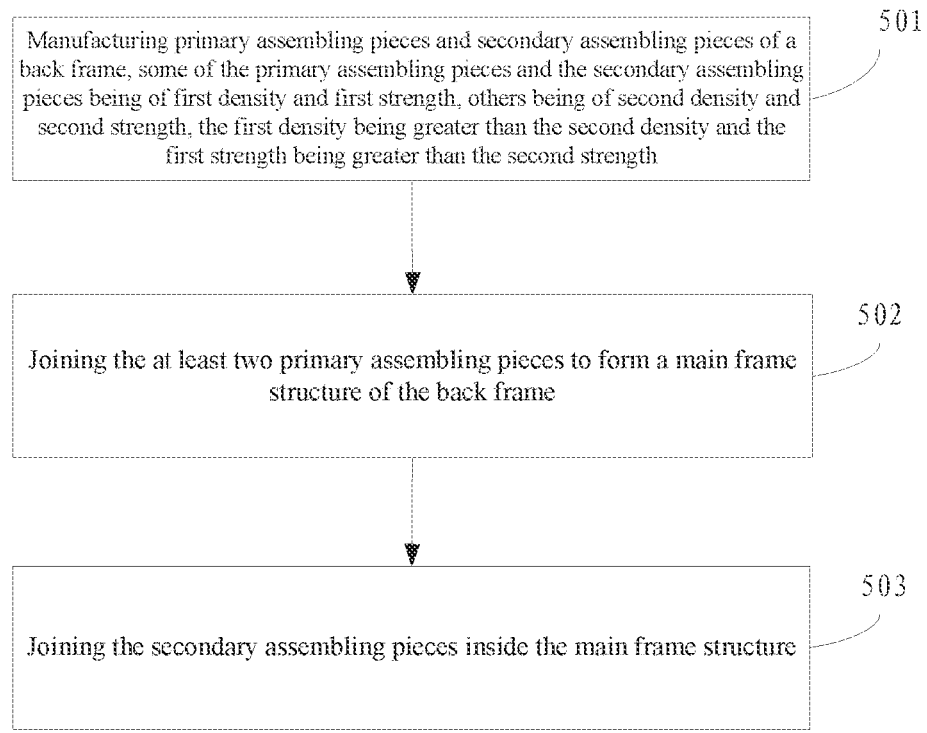
FIG. 19 is a flow chart showing a method for manufacturing a back frame of a flat panel display device according to a seventeenth embodiment of the present invention.

As shown in FIG. 19, the present invention also provides a method for making a back frame of flat panel display device. The method comprises the following steps:

Step 501: manufacturing primary assembling pieces and the secondary assembling pieces of a back frame, some of the primary assembling pieces and the secondary assembling pieces being of first density and first strength, others being of second density and second strength, the first density being greater than the second density and the first strength being greater than the second strength;

Step 502: joining the at least two primary assembling pieces to form a main frame structure of the back frame; and Step 503: joining the secondary assembling pieces inside the main frame structure.

In the instant embodiment, the step of manufacturing primary assembling pieces of a back frame comprises manufacturing at least first and second primary assembling pieces, in which the first primary assembling piece has an end forming at least two joint sections, each of the joint sections having a structure that mates a corresponding end of the second primary assembling piece; and the step of joining the at least two primary assembling pieces to form a main frame structure of the back frame comprises selecting one joint section of the at least two joint sections according to a size of the back frame to join the corresponding end of the second primary assembling piece.

The design of material for the primary assembling pieces and the secondary assembling pieces of the back frame in Step 501 can be any one of the designs shown in FIGS. 16, 17, and 18 or other designs of various combinations of multiple materials.

In the instant embodiment, when other joint sections are present between the joining location of the second primary assembling piece and the end of the first primary assembling piece, before or after the step of selecting one joint section of the at least two joint sections according to a size of the back frame to join the corresponding end of the second primary assembling piece, the other joint sections of the first primary assembling piece that are located outward of the joining position of the second primary assembling piece are trimmed off.

Figure 20:
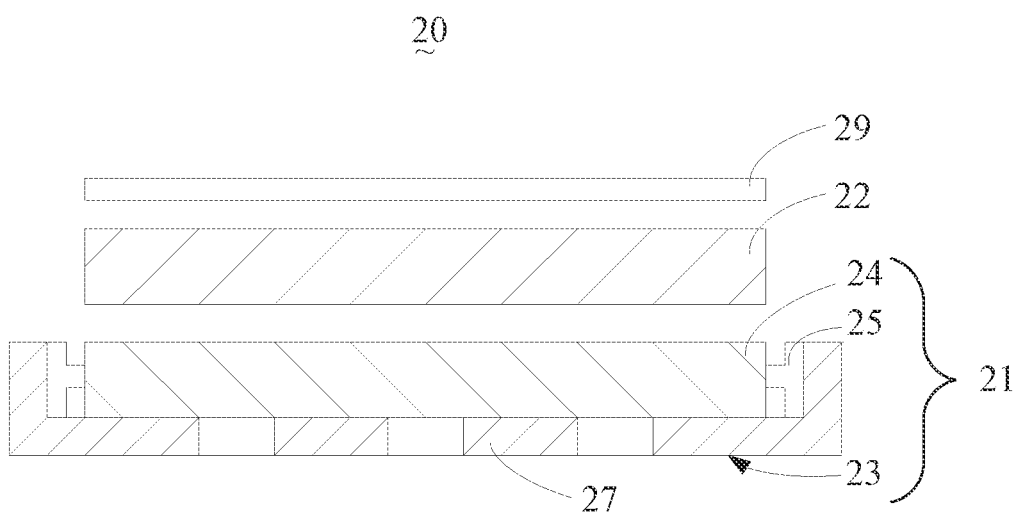
FIG. 20 is a schematic view showing a flat panel display device with a touch screen according to an eighteenth embodiment of the present invention.

As shown in FIG. 20, the flat panel display device 20 of the present invention further comprises a touch screen 29. The touch screen 29 is arranged on a light exit surface of the display panel 22 of the flat panel display device 20. The flat panel display device 20 comprises: the backlight system 21 and the above discussed display panel 22. The backlight system 21 is arranged at the back side of the display panel 22 and supplies light to the display panel 22.

The backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the at least one first and second primary assembling pieces form a main frame structure 27 of the back frame 23.

It is noted that the flat panel display device 20 of the present invention can be a liquid crystal display device or a liquid crystal television.

Figure 21:
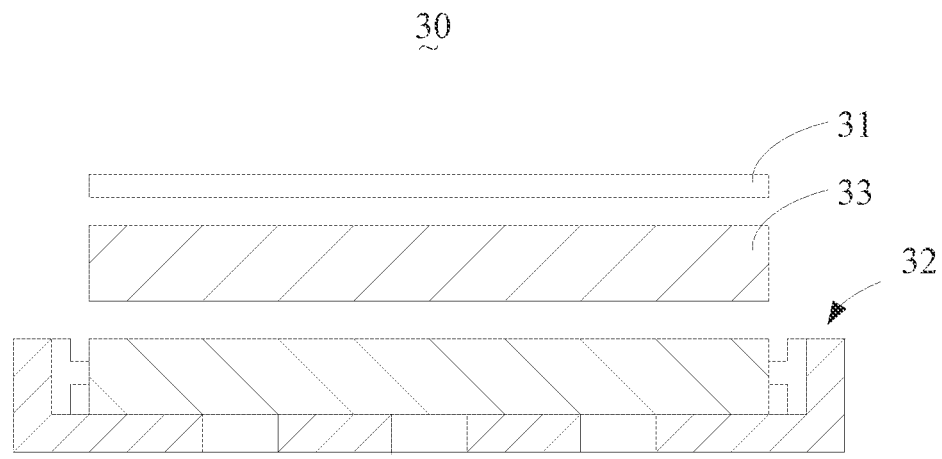
FIG. 21 is a schematic view showing a stereoscopic display device according to a nineteenth embodiment of the present invention.

The present invention also provides a stereoscopic display device 30, as shown in FIG. 21. The stereoscopic display device 30 comprises a liquid crystal lens grating 31, a backlight system 32, and a display panel 33. The liquid crystal lens grating 31 is arranged on a light exit surface of the display panel 33. The backlight system 32 can be a backlight system of one of the above discussed embodiments, such as the backlight system 32 comprising the back frame 23. The back frame 23 comprises at least first primary assembling piece and the second primary assembling piece. The at least first and second primary assembling pieces form a main frame structure of the back frame. Repeated description will be omitted herein.

Figure 22:
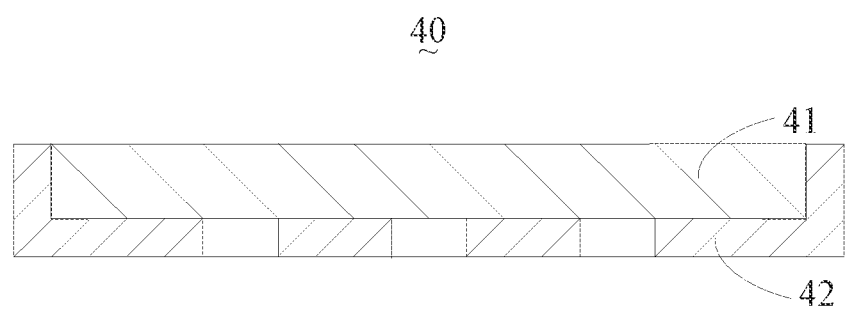
FIG. 22 is a schematic view showing a plasma display device according to a twentieth embodiment of the present invention.

The present invention also provides a plasma display device 40, as shown in FIG. 22. The plasma display device 40 comprises a plasma display panel 41 and a back frame 42. The back frame 42 is arranged at a back side of the display panel 41. The back frame 42 can be the back frame of each of the previously discussed embodiments and repeated description will be omitted herein.

With the above discussed manners, the present invention provides a flat panel display device, a stereoscopic display device, and a plasma display device that have a mold for back frame that is of a simple structure and can reduce the expenditure for mold of back frame, and can also save the material used for back frame so as to lower down the cost of flat panel display device.

Embodiments of the present invention have been described, but are not intending to impose any undue constraint to the appended claims of the present invention. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A back frame of a flat panel display device, wherein:
the back frame comprises primary assembling pieces and secondary assembling pieces;
the primary assembling pieces are of a number of at least two, the at least two primary assembling pieces being joined to form a main frame structure of the back frame;
the secondary assembling pieces are arranged inside the back frame and joined to the back frame;
some of the primary assembling pieces and the secondary assembling pieces are of first density and first strength and others are of second density and second strength; and
the first density is greater than the second density and the first strength is greater than the second strength,
wherein the at least two primary assembling pieces comprise first and second primary assembling pieces that are joined to each other, in which the first primary assembling piece has an end having a surface forming at least two joint sections that are arranged to space from each other in a lengthwise direction of the first primary assembling piece, each of the joint sections having a structure mating an end of the second primary assembling piece, the end of the second primary assembling piece being selectively jointed to a first one and a second one of the two spaced joint sections, with the other joint section of the first primary assembling piece being idle, so that the second primary assembling piece is connected to the first primary assembling piece in a position-adjustable manner to respectively define a first size and a second size of the back frame, the second size being different from the first size.

2. The back frame as claimed in claim 1, wherein:
the primary assembling pieces are galvanized steel pieces having the first density and the first strength and the secondary assembling pieces are plastic pieces having the second density and the second strength.

3. The back frame as claimed in claim 1, wherein:
the primary assembling pieces are plastic pieces having the second density and the second strength and the secondary assembling pieces are galvanized steel pieces having the first density and the first strength.

4. The back frame as claimed in claim 1, wherein:
some of the primary assembling pieces and the secondary assembling pieces are of a third density and a third strength, the third density being between the first density and the second density, the third strength being between the first strength and the second strength.

5. The back frame as claimed in claim 4, wherein:
some of the primary assembling pieces and the secondary assembling pieces are galvanized steel pieces having the first density and the first strength, some are plastic pieces having the second density and the second strength, and others are aluminum pieces of the third density and the third strength.

6. The back frame as claimed in claim 1, wherein:
the joint sections comprise recesses formed in a surface of the first primary assembling piece and having a shape corresponding to the end of the second primary assembling piece for receiving the end of the second primary assembling piece.

7. The back frame as claimed in claim 6, wherein:
the recess of the first primary assembling piece forms in a bottom thereof a first through hole, the second primary assembling piece forming in a corresponding location a second through hole, the back frame comprising a fastener, the fastener extending through the first through hole and the second through hole to join the first primary assembling piece and the second primary assembling piece to each other.

8. The back frame as claimed in claim 1, wherein:
the joint sections comprise recesses formed in a surface of the first primary assembling piece, the second primary assembling piece having an end having a surface forming at least two protrusions that are arranged to space from each other in a lengthwise direction of the second primary assembling piece, the protrusions being receivable in the recesses to join the first primary assembling piece and the second primary assembling piece to each other.

9. The back frame as claimed in claim 1, wherein:
the back frame comprises a third primary assembling piece and a fourth primary assembling piece; and
the first primary assembling piece, the second primary assembling piece, the third primary assembling piece, and the fourth primary assembling piece are straight linear and are joined to each other in a leading end-to-tailing end manner to form a rectangular main frame structure enclosing the back frame.

10. The back frame as claimed in claim 9, wherein:
the secondary assembling pieces comprise a first secondary assembling piece and a second secondary assembling piece, the first secondary assembling piece having two ends respectively joined to at least two primary assembling pieces of the first primary assembling piece, the second primary assembling piece, the third primary assembling piece, and the fourth primary assembling piece, the second secondary assembling piece having two ends respectively joined to at least two primary assembling pieces of the first primary assembling piece, the second primary assembling piece, the third primary assembling piece, and the fourth primary assembling piece.

11. The back frame as claimed in claim 10, wherein:
the two ends of the first secondary assembling piece are respectively joined to the first primary assembling piece and the second primary assembling piece that are adjacent to each other and the two ends of the second secondary assembling piece are respectively joined to the third primary assembling piece and the fourth primary assembling piece that are adjacent to each other; or
the two ends of the first secondary assembling piece are respectively joined to the first primary assembling piece and the third primary assembling piece that are opposite to each other and the two ends of the second secondary assembling piece are respectively joined to the first primary assembling piece and the third primary assembling piece that are opposite to each other, the second primary assembling piece, the fourth primary assembling piece, the first secondary assembling piece, and the second secondary assembling piece being arranged parallel to each other.

12. The back frame as claimed in claim 10, wherein:
the back frame comprises at least one bracing piece, which is releasably fixed to one or more of the first primary assembling piece, the second primary assembling piece, the third primary assembling piece, the fourth primary assembling piece, the first secondary assembling piece, and the second secondary assembling piece, the bracing piece forming a bump.

13. A backlight system, wherein:
the backlight system comprises a light source, a light homogenization mechanism, and a back frame; and
the back frame carries the light source and the light homogenization mechanism, the back frame being a back frame claimed in claim 1.

14. A method for making a back frame of a flat panel display device, wherein:
manufacturing primary assembling pieces and secondary assembling pieces of the back frame, the primary assembling pieces being of a number of at least two;
joining the at least two primary assembling pieces to form a main frame structure of the back frame; and
joining the secondary assembling pieces inside the main frame structure;
wherein the step of manufacturing the primary assembling pieces of the back frame comprises: manufacturing at least first and second primary assembling pieces, in which the first primary assembling piece has an end forming at least two joint sections, each of the joint sections having a structure that mates a corresponding end of the second primary assembling piece;
wherein the step of joining the at least two primary assembling pieces to form a main frame structure of the back frame comprises: selecting one joint section of the at least two joint sections according to a size of the back frame to join the corresponding end of the second primary assembling piece; and
wherein when an additional joint section is present between joining location of the second primary assembling piece and the end of the first primary assembling piece, before or after the step of selecting one joint section of the at least two joint sections according to a size of the back frame to join the corresponding end of the second primary assembling piece, the additional joint section of the first primary assembling piece that is located outward of the joining position of the second primary assembling piece is trimmed off.

* * * * *